United States Patent
Tian

(10) Patent No.: US 10,268,282 B2
(45) Date of Patent: Apr. 23, 2019

(54) FOOT-OPERATED TOUCHPAD SYSTEM AND OPERATION METHOD THEREOF

(71) Applicant: Xin Tian, Niskayuna, NY (US)

(72) Inventor: Xin Tian, Niskayuna, NY (US)

( * ) Notice: Subject to any disclaimer, the term of this patent is extended or adjusted under 35 U.S.C. 154(b) by 0 days.

(21) Appl. No.: 15/272,280

(22) Filed: Sep. 21, 2016

(65) Prior Publication Data

US 2017/0364163 A1   Dec. 21, 2017

Related U.S. Application Data

(60) Provisional application No. 62/352,911, filed on Jun. 21, 2016.

(51) Int. Cl.
  *G06F 3/033*  (2013.01)
  *G06F 3/0354*  (2013.01)
  *G06F 3/01*  (2006.01)

(52) U.S. Cl.
  CPC ............ *G06F 3/0334* (2013.01); *G06F 3/017* (2013.01); *G06F 3/03545* (2013.01); *G06F 3/03547* (2013.01)

(58) Field of Classification Search
  None
  See application file for complete search history.

(56) References Cited

U.S. PATENT DOCUMENTS

| | | | | |
|---|---|---|---|---|
| 5,576,727 A | * | 11/1996 | Rosenberg | ............. B25J 9/1692 345/161 |
| 2011/0199393 A1 | | 8/2011 | Nurse et al. | |
| 2015/0070304 A1 | * | 3/2015 | Lettow | .................... G06F 3/044 345/174 |
| 2016/0034171 A1 | | 2/2016 | Jerie | |

OTHER PUBLICATIONS

Christoph Labacher, "Feet_ a study on foot-based interaction (Part 1)—Medium" Website. Apr. 16, 2015 <https://medium.com/@ChristophLabacher/feet-a-study-on-foot-based-interaction-part-1-c3f8e7b436ba#.uzdurab8p> pp. 1-11.
Jason Alexander et al., "Putting Your Best Foot Forward: Investigating Real-World Mappings for Foot-based Gestures" pp. 1-10.
Kangkang Yin et al., "FootSee: an Interactive Animation System", Eurographics/SIGGRAPH Symposium on Computer Animation (2003) D. Breen, M. Lin (Editors) pp. 1-10.
Joseph J Laviola, Jr., "Bringing 2D Interfaces into 3D Worlds" pp. 1-23.

(Continued)

*Primary Examiner* — Brian M Butcher
(74) *Attorney, Agent, or Firm* — Anova Law Group, PLLC

(57) ABSTRACT

A foot-operated touchpad system and an operation method thereof are provided. The foot-operated touchpad system includes a touch-sensitive device and a foot-wearable pattern pad. The foot-wearable pattern pad includes a backing layer. The backing layer includes pattern areas that are positioned such that: when a human foot is placed on the backing layer, the pattern areas correspond to a fore part and a heel part of the human foot. A pattern is on one pattern area and patterns on different pattern areas are distinguishable from each other. Each pattern is rotation-sensitive. The pattern includes a number of stylus-type dots that are capable of interacting with the touch-sensitive device.

16 Claims, 10 Drawing Sheets

(56) References Cited

OTHER PUBLICATIONS

Koumei Fukahori, "Exploring Subtle Foot Plantar-Based Gestures Using Sock-Placed Pressure Sensors", A Master Thesis Submitted to the Graduate School of the University of Tokyo, Jan. 26, 2016 pp. 1-43.

Bernhard Slawik, "ShoeSoleSense for Peripheral Interaction" pp. 1-4.

Thomas Augsten et al., "Multitoe: High-Precision Interaction with Back-Projected Floors Based on High-Resolution Multi-Touch Input" pp. 1-10.

\* cited by examiner

FOOT-OPERATED TOUCHPAD SYSTEM AND OPERATION METHOD THEREOF

CROSS-REFERENCES TO RELATED APPLICATIONS

This application claims the priority of Provisional Patent Application No. 62/352,911, filed on Jun. 21, 2016, the entire content of which is incorporated herein by reference.

FIELD OF THE DISCLOSURE

The present disclosure generally relates to the field of information technology and, more particularly, relates to a foot-operated touchpad system and an operation method thereof, for providing foot directional information and gesture information.

BACKGROUND

A touchpad is an input device that is generally capable of detecting touches and the location of touches within the touch panel. The touches may be provided by a stylus, human finger, or the like. Touchpads have been developed as additional or alternative input devices to mouse for computers. The current state of the art touchpad technologies are able to detect multi-touches from human fingers and provide hand gesture information. Commercially notable touchpads may include the Apple Magic Trackpad for Mac computers and trackpads developed to use with Microsoft Windows systems.

However, all the existing trackpads are developed to acquire and interpret inputs from human finger touches. None of them are designed to effectively receive inputs from human feet and to provide foot directional and gesture information from the inputs.

The disclosed foot-operated touchpad system and operation method thereof are directed to solve one or more problems set forth above and other problems in the art.

BRIEF SUMMARY OF THE DISCLOSURE

One aspect of the present disclosure provides a foot-operated touchpad system. The foot-operated touchpad system includes a touch-sensitive device; and a foot-wearable pattern pad. The foot-wearable pattern pad includes a backing layer including pattern areas. The pattern areas are positioned such that: when a human foot is placed on the backing layer, the pattern areas correspond to a fore part and a heel part of the human foot. A pattern is on one pattern area. Patterns on different pattern areas are distinguishable from each other, each pattern being rotation-sensitive, and the pattern includes a number of stylus-type dots that are capable of interacting with the touch-sensitive device.

Optionally, the pattern areas are positioned such that: when a human left foot is placed on the foot-wearable pattern pad, the pattern areas correspond to a fore part and a heel part of the human left foot, and when a human right foot is placed on the foot-wearable pattern pad, the pattern areas correspond to a fore part and a heel part of the human right foot.

Optionally, the foot-operated touchpad system further includes a pair of foot-wearable pattern pads corresponding to a pair of human feet. The pair of foot-wearable pattern pads includes four different pattern areas including: a first pattern area positioned corresponding to a fore part of a bottom of a human left foot, a second pattern area positioned corresponding to a heel part of the bottom of the human left foot, a third pattern area positioned corresponding to a fore part of a bottom of a human right foot, and a fourth pattern area positioned corresponding to a heel part of the bottom of the human right foot. The patterns on the first pattern area, the second pattern area, the third pattern area, and the fourth pattern area are distinct and rotation-sensitive patterns.

Optionally, the distinct patterns are distinguishable first in a shape, then in a size.

Optionally, the backing layer is a single layer including a paper sheet, a fabric cloth, a sock, an insole, and a shoe sole.

Optionally, the backing layer includes one or more layers selected from a paper sheet, a fabric cloth, a sock, an insole, and a shoe sole, wherein the one or more layers are stacked with one another.

Optionally, the touch-sensitive device includes: a touch sensor layer sandwiched between a first protection layer and a second protection layer, and a controller-processor-communication unit used to: control the touch-sensitive device for pattern touch detection; process detected touch coordinates for pattern detections; process the pattern detections for foot directional information extraction; optionally perform user directional information extraction and foot gesture detections; and send processed information to external devices.

Optionally, each of the first protection layer and the second protection layer is capable of protecting the touch sensor layer from being damaged and malfunctioned when a pressure is applied thereon from the human foot.

Optionally, the touch sensor layer includes a multi-touch sensor configured to obtain coordinates of detected touch points, corresponding to the stylus-type dots of the foot-wearable pattern pad applied there-on.

Optionally, the touch-sensitive device further includes a weight sensor configured to provide a measurement of a total weight applied over the touch-sensitive device, or further includes a pressure sensor array configured as a top of the touch-sensitive device, or the foot-operated touchpad system includes a pressure sensor configured on a side of the backing layer at a location in line with each pattern area.

Another aspect of the present disclosure provides a method for using a foot-operated touchpad system. The method includes pressing, by human feet, a pair of pattern pads to touch a touch-sensitive device, wherein each pattern pad includes two patterns on a backing layer; obtaining coordinates of touch points provided by the touch-sensitive device; based on the coordinates of the touch points, determining one or more detected patterns on the pair of the pattern pads; obtaining a left foot direction vector and a right foot direction vector by processing information of the one or more detected patterns; fusing the left foot direction vector and the right foot direction vector to provide user directional information; and determining foot gestures based on the information of the one or more detected patterns, the left foot direction vector and right foot direction vector, and coordinates of pattern center points of the detected patterns.

Optionally, the coordinates of the pattern center points of the detected patterns are obtained by: detecting each pattern on each pattern pad by the touch-sensitive device; and processing the coordinates of the touch points corresponding to each pattern on each pattern pad to provide coordinates of pattern center points of the patterns on each pattern pad.

Optionally, the step of obtaining a left foot direction vector and a right foot direction vector includes: when the two patterns on each pattern pad have been detected by the touch-sensitive device, for each detected pattern: using the coordinates of the pattern center points of the detected two patterns on a first pattern pad to provide a left foot direction vector; and using the coordinates of the pattern center points of the two patterns on a second pattern pad to provide a right foot direction vector.

Optionally, the step of obtaining a left foot direction vector and a right foot direction vector includes: when one or two patterns on each pattern pad are detected by the touch-sensitive device, for each detected pattern: processing the coordinates of the touch points corresponding to a detected pattern to obtain a predefined pattern reference directional vector of the corresponding detected pattern. The calculated pattern reference directional vector corresponding to each of the one or two patterns on a first pattern pad provides a left foot direction vector, and the calculated pattern reference directional vector corresponding to each of the one or two patterns on a second pattern pad provides a right foot direction vector.

Optionally, the pre-defined reference directional vector of each pattern and the corresponding foot direction vector form a fixed angle ranging from −180 to 180°.

Optionally, each pattern includes stylus-type dots capable of interacting with the touch-sensitive device, and the detected touch points correspond to a number of stylus-type dots in each of the distinct patterns.

Optionally, the foot gestures are determined based on a transition sequence between pattern detection states over time, in conjunction with the left foot direction vector and right foot direction vector, coordinates of pattern center points of the detected patterns.

Optionally, the pattern detection state includes a combination of multiple detected pattern sets, and each detected pattern set includes one or more detected patterns on the pair of the pattern pad.

Optionally, the foot gestures include Left foot taps, Right foot taps, one foot hops, jump and four types of foot wiggling movements.

Optionally, the method further includes repeating each step at every sampling time performed by the touch-sensitive device; or measuring a total weight over the touch-sensitive device at each sampling time using a weight sensor configured in the touch-sensitive device; or providing pressure distribution information with respect to the coordinates of the touch points by a pressure sensor array configured in the touch-sensitive device or by a pressure sensor configured on a side of the backing layer at a location in line with each pattern area. The obtained weight and pressure distribution information may be used in foot gesture detections to support detection of new types of foot gestures and/or to improve foot gesture detection performance.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
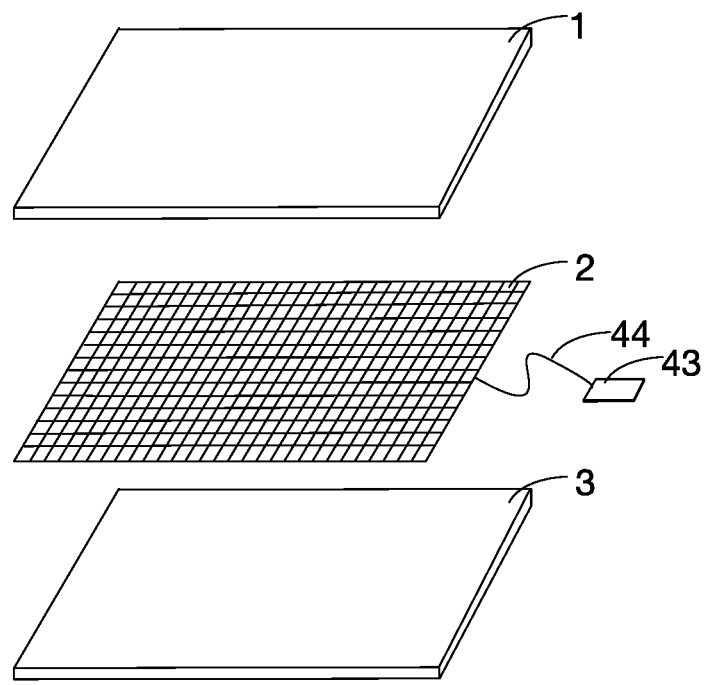
FIG. 1 illustrates components of an exemplary touch-sensitive device according to various embodiments of the present disclosure.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present disclosure. Based on the disclosed embodiment, persons of ordinary skill in the art may derive other embodiments consistent with the present disclosure, all of which are within the scope of the present disclosure.

The present disclosure provides a foot-operated touchpad system and operation method thereof. An exemplary foot-operated touchpad system may include a touch-sensitive device and a pattern pad. Another exemplary foot-operated touchpad system may include a touch-sensitive device and a pair of pattern pads. In some embodiments, the pattern pad(s) may be foot wearable. In other embodiments, the pattern pad(s) may be attached to foot wearable(s). Unless otherwise specified, the disclosed pattern pad may be referred to a foot-wearable pattern pad. In various embodiments, the touch-sensitive device may be a foot-operated touch-sensitive device.

By using the disclosed foot-operated touchpad system and method, foot directional information and gesture information of human foot/feet, which are placed on the pattern pad for the pattern pad to interact with the touch-sensitive device, may be obtained.

As used herein, the term "foot directional information" refers to direction/directions that foot/feet in operation point at. The term "foot directional information" and "foot pointing information" may be interchangeably used.

As used herein, the term "foot gesture information" may include simple gestures, such as taps by foot/feet, and complex gesture behaviors, such as walking, jumping, running, etc.

A pattern pad may include multiple patterns distinct to one another. Such multiple patterns may be sensed by sensor(s) in the touch-sensitive device when they are in touch with each other. In one embodiment, the touch-sensitive device may be a touchpad suitable for human foot/feet to operate. Processing of the touch sensor data supports detections of the patterns on the pattern pad and provides positional and directional information of the patterns in the reference coordinates of the touch-sensitive device. The pattern detections further support foot contact detection, positional and directional information evaluation, and foot/body gesture detections.

For example, the touch-sensitive device may be able to detect, periodically at a sampling rate, the presence of patterns when they are in touch with a touch-sensitive device. The touch-sensitive device then provides coordinates of the detected patterns in the coordinate system of the touch-sensitive device based on the pattern detection results.

In one embodiment, the touch-sensitive device has a projected capacitive digitizer supporting multi-touch detection, and two protection layers (above and beneath the digitizer) to protect the digitizer from weight and pressure on the device surface from foot/feet when in use.

In the present disclosure, patterns for different foot positions are distinct to one another. For example, any distinct shapes (e.g., portions of a contour shape of a foot) that are placed, worn or inherently existed under a bottom of human foot/feet may be used for the patterns.

For example, the distinct patterns can be designed to be first distinguishable from their shapes. A pattern registration process may first identify the four patterns by distinguishing their shapes. Then for the two patterns on the same pattern pad (for the same foot), additional features can be further determined, saved, and used for later pattern detections. Such additional features include, e.g., i) lengths of lines that connect any two pattern touch (feature) points in the two patterns on a same pattern pad, and ii) angles from the lines connecting any two pattern touch points in the two patterns to a predefined reference direction vector in the corresponding pattern pad. The disclosed system allows use of patterns with different sizes, and enhances pattern detection and identification performance in challenging conditions.

In certain embodiments, the patterns are made of materials that can be sensed when they are in touch with the touch-sensitive device's top surface. In one embodiment, the patterns on the pattern pads are made of a stylus type of material to work with a projected capacitive digitizer supporting multi-touch for pattern detections. The patterns may be attached to a material that will not cause unwanted detections that interfere with the pattern detection.

The pattern detection results include detected patterns at each touch sensor data sampling time, and the coordinates of the detected touch points corresponding to each detected pattern. The pattern detection results can be used to obtain directional information and gesture information of foot/feet in operation.

In various embodiments, the disclosed foot-operated touchpad system and operation method thereof may be used to generate controls for electronic systems, such as computer, TV, game console, smart phone, etc. The disclosed foot-operated touchpad system and operation method thereof may also provide rich control and gesture information from human foot/feet that are not available from hand based input/control systems. The control and gesture information can be used in, for example, video game applications, interactive 3D programs, and virtual reality applications.

FIG. 1 illustrates components of an exemplary touch-sensitive device in accordance with various embodiments of the present disclosure. For example, the exemplary touch-sensitive device may be configured to receive and detect inputs operated by human foot/feet according to various embodiments of the present disclosure.

The touch-sensitive device illustrated in FIG. 1 may include a first protection layer 1, a touch sensor layer 2, and a second protection layer 3. In one embodiment, the touch sensor layer 2 is sandwiched between the first protection layer 1 and the second protection layer 3.

The first protection layer 1 may be configured to protect the touch sensor layer 2 from being damaged and/or malfunctioned under a pressure, e.g., from human foot/feet. The first protection layer 1 may or may not be optically transparent. The first protection layer 1 may be made of a material having a sufficient hardness for protecting the touch sensor layer 2. In certain embodiments, the top protection layer 1 includes a glass or plastic layer with sufficient strength.

The touch sensor layer 2 may be a touch sensing layer that is able to make touch detections in response to a touch on the touch-sensitive device and to provide coordinates of the detected touches in a sensing coordinate system of the touch sensor layer 2. In certain embodiments, the touch sensor layer 2 may include digitizers to provide projected capacitive detection and multi-touch support for the touch sensor layer 2.

As shown in FIG. 1, the touch sensor layer 2 may further be connected to a controller-processor-communication unit 43 through a cable 44 for collecting and processing touch detection information, and further distribution of the information through wired or wireless communication links to other devices, such as a computer, a cell phone, a game console, etc.

For example, the controller-processor-communication unit 43 can be used to control the touch sensitive device for the detection of pattern touches, e.g., via stylus-type materials, and to process the detected touch coordinates for pattern detections, and to further process the pattern detection results for foot directional information extraction, user directional information extraction and foot gesture detections. The controller-processor-communication unit 43 can then send the processed information to external devices through wired or wireless communication links.

The second protection layer 3 may be configured to protect the touch sensor layer 2 from being damaged or malfunctioned when being touched under pressure. In one embodiment, the first and second protection layers 1 and 3 may be the same.

As such, the combination of the protection layers 1 and 3 may protect the touch sensor layer 2 from excessive pressure in operation, when a pressure is applied on the touch-sensitive device, e.g., by human foot/feet. In one embodiment, the first protection layer 1 and second protection layer 3 may be bonded together to securely enclose the touch sensor layer 2 there-between.

In one embodiment, the touch-sensitive device may have a minimum size to receive, support, and allow turning movements of both human feet.

Figure 2:
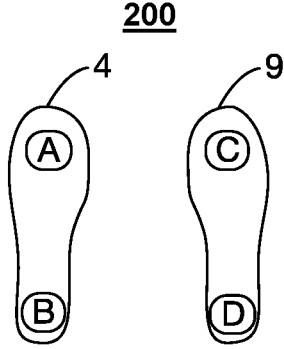
FIG. 2 illustrates an exemplary pair of pattern pads according to various embodiments of the present disclosure.

FIG. 2 illustrates an exemplary pair of pattern pads according to various embodiments of the present disclosure. For illustration purposes, the pair of pattern pads may be described to have a left pattern pad and a right pattern pad. In one embodiment, the left pattern pad may have a shape corresponding to a bottom of a left foot, e.g., of an average person, while the right pattern pad may have a shape corresponding to a bottom of a right foot, e.g., of an average person. For example, each pattern pad may be designed relative to a contour of a corresponding human foot.

As shown, the left pattern pad may include a first backing layer 4 and pattern areas A and B. Although two pattern areas are illustrated on the first backing layer 4, various embodiments may include pattern areas less than or more than two on the first backing layer 4.

The right pattern pad in FIG. 2 may include a second backing layer 9 and pattern areas C and D. Although two pattern areas are illustrated on the second backing layer 9, various embodiments may include pattern areas less than or more than two on the second backing layer 9.

In some embodiments, the first backing layer 4 and the second backing layer 9 may be made of same material and having symmetric shapes. In other embodiments, the first backing layer 4 and the second backing layer 9 may be made of different materials and having symmetric shapes. Each of the first backing layer 4 and the second backing layer 9 may be a paper sheet, a fabric cloth, a sock, an insole, and/or a shoe sole. In one embodiment, each of the first backing layer 4 and the second backing layer 9 may be made of stacked layers for example, including, a paper on a shoe sole. Like a pair of shoes, the first backing layer 4 and the second backing layer 9 of a same pair of pattern pads may have sizes and shapes in line with human "shoe sizes" and shoe shapes.

In various embodiments, the pattern areas A, B, C, and D may be positioned, such that when the pair of pattern pads are placed under human feet, those areas are most frequently or being the first touching area to be in touch with the ground and/or surface of a touch-sensitive device, such as a suitable touchpad.

In various embodiments, pattern areas A and B may be positioned on the first backing layer 4 at locations corresponding to a bottom of a human left foot. For example, the patterned area A may be positioned at a location corresponding to a center of a fore-foot (or a center of ball of foot), the patterned area B may be positioned at a location corresponding to a center of a back-foot (or a center of heel) of a human left foot.

Pattern areas C and D may be positioned on the second backing layer 9 at locations corresponding to a bottom of a human right foot. For example, the patterned area C may be positioned at a location corresponding to a center of a fore-foot (or a center of a front part or a ball of foot), the patterned area D may be positioned at a location corresponding to a center of a back-foot (or a center of heel) of a human right foot.

The pattern areas A and B may be positioned having a distance there-between, e.g., according to a human left foot. This may facilitate to provide desired foot directional information. Likewise, the pattern areas C and D may be positioned having a distance there-between, e.g., according to a human right foot. This may facilitate to provide desired foot directional information.

On pattern areas A, B, C, and D, various different patterns may be formed, e.g., by arranging stylus-type dots. These patterns may be distinct from each other. In one embodiment, these patterns, with or without the backing layer, may be placed, worn or otherwise existed in connection with the shape and touching area of human foot/feet, e.g., the front part and heel part of human foot/feet, such that: when the human foot/feet in operation get to press these patterns, the patterns and human foot/feet may be naturally fitted with each other. Note that, the backing layer may be optional in accordance with various embodiments of the present disclosure, as long as the patterns are in position when pressure is applied thereon by human foot/feet. For example, the patterns may be attached to socks or shoe bottoms in position, when they are being used.

Figure 3:
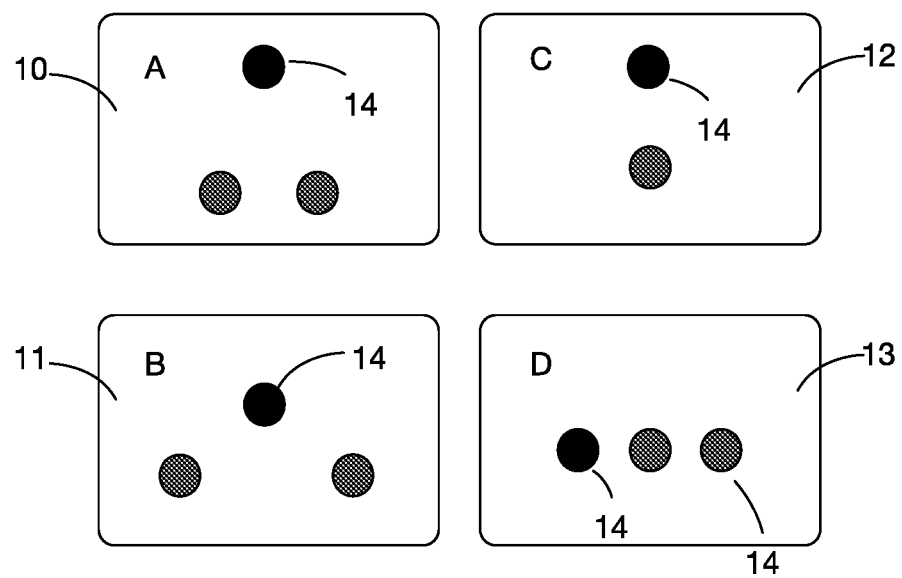
FIG. 3 illustrates exemplary patterns on different pattern areas of a pair of pattern pads according to various embodiments of the present disclosure.

FIG. 3 illustrates exemplary patterns 10, 11, 12 and 13 on pattern areas A, B, C and D respectively on the pair of pattern pads according to various embodiments of the present disclosure. Note that, the patterns 10, 11, 12 and 13 illustrated in FIG. 3 are exemplary, any other suitable patterns can be included in the present disclosure without any limitation. Each of the patterns 10, 11, 12 and 13 can be arranged on one of the pattern areas A, B, C, and D. In various embodiments, the patterns 10, 11, 12 and 13 are different and distinguishable from each other.

As shown in FIG. 3, stylus-type dots 14 may be used and arranged to form patterns 10, 11, 12 and 13 on pattern areas A, B, C, and D. The stylus-type dots 14 may be made of any stylus-type material(s) that can be sensed or detected by the touch sensor layer 2 of the touch-sensitive device shown in FIG. 1.

The stylus-type dots 14 may be made of conductive or semi-conductive materials. For example, the stylus-type dots may be made of a conductive rubber or a conductive foam. When stylus-type dots 14 touch or being pressed onto the touch-sensitive device, the stylus-type dots 14 arranged in certain pattern can be detected by the touch-sensitive device. For example, each detected stylus-type dot 14 corresponds to coordinates of a touch point detected by the touch sensor layer 2 of the touch-sensitive device.

The stylus-type dots 14 may have an elongated 3-D structure and may be in a form of shafts, pillars, wires, rods, and/or needles. The stylus-type dots 14 may have various cross sectional shapes including, for example, rectangular, polygonal, oval, or circular shape. Accordingly, the stylus-type dots 14 may have, for example, cylindrical 3-dimensional shapes.

The patterns 10, 11, 12, and 13 formed on a pair of pattern pads may have a shape formed by the stylus-type dots 14, which are distinguishable from one another. For example, when connecting the stylus-type dots in pattern 10 on pattern area A of the exemplary left pattern pad in FIG. 2, a virtual triangle may be formed to have two and only two equal-length sides forming an acute angle there-between.

In another example, when connecting the stylus-type dots in pattern 11 on pattern area B of the exemplary left pattern pad in FIG. 2, another virtual triangle may be formed to have two equal-length sides forming an obtuse angle there-between. Patterns 10 and 11 are distinct from each other regardless moving status and rotation status of the exemplary left pattern pad.

When connecting the stylus-type dots 14 in pattern 12 on pattern area C of the exemplary right pattern pad in FIG. 2, a virtual straight line may be formed by two stylus-type dots 14, which is distinguishable from patterns 10 and 11 regardless of the moving status and rotation status of the exemplary right pattern pad.

When connecting the stylus-type dots 14 in pattern 13 on pattern area D of the exemplary right pattern pad in FIG. 2, a virtual straight line may be formed by three stylus-type dots 14 which is distinguishable from patterns 10 and 11 regardless of the moving status and rotation status of the exemplary right pattern pad. Patterns 12 and 13 can be distinguished from each other based on the number stylus-type dots 14 in the corresponding pattern.

Referring back to FIG. 2, stylus-type dots 14 for forming patterns 10-13 on the exemplary pair of pattern pads may be made of a material different than the first and second backing layers 4 and 9. The first and second backing layers 4 and 9 may not be made of any material that may be sensed or detected by the touch sensor layer 2 of the touch-sensitive device. The first and second backing layers 4 and 9 may not be made of any material that may interfere the detection of the stylus-type dots 14.

In certain embodiments, stylus-type dots 14 may be able to work with a projected capacitive multi-touch digitizer in the touch sensor layer 2. In one embodiment, stylus-type dots 14 may have a circular cross-section and may be made of a passive or active stylus material.

The exemplary patterns 10-13 of the pair of pattern pads may be distinguished from each other by their basic feature differences, e.g., by their shape and/or virtual shape, and may further be distinguished from each other by additional features including sizes, lengths of the lines connecting the pattern dots, etc. Additionally, these distinguishable features can be learned by a learning algorithm at, e.g., the controller-processor-communication unit 43, to enhance pattern detection performance, which allows pattern detection and identification even when only a portion of the pattern is detected.

For example, in one sampling time, only two stylus-type dots from pattern 10 are detected. However, based on the dot distance signature obtained in the initial pattern registration process, it may be decided that the two detected stylus-type dots belong to pattern 10 instead of pattern 11, 12, or 13.

For the exemplary two identified/detected patterns on each foot, the lengths of the lines connecting any two dots (e.g., the stylus-type dots), and the angles between the lines and a predefined reference direction on the corresponding pattern pad may be measured and registered as additional signatures of the patterns to improve future pattern detection performance.

Figure 4:
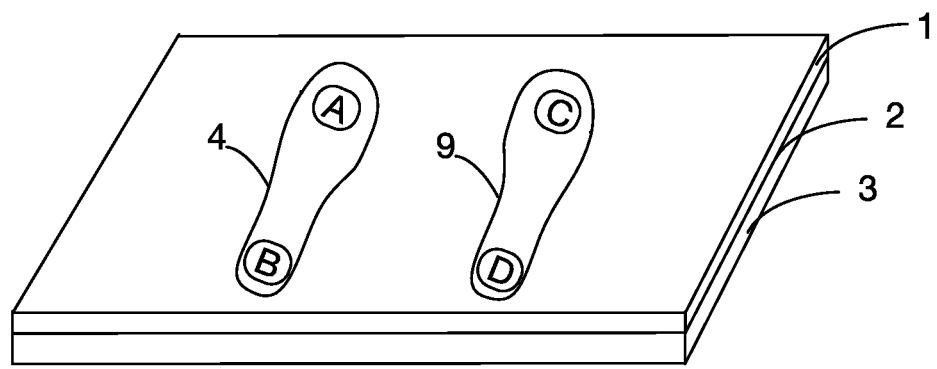
FIG. 4 illustrates an exemplary foot-operated touchpad system according to various embodiments of the present disclosure.

FIG. 4 illustrates an exemplary foot-operated touchpad system in accordance with various embodiments of the present disclosure. For example, the system in FIG. 4 may include the touch-sensitive device 100 illustrated in FIG. 1 and the pair of the pattern pads 200 shown in FIG. 2.

The controller-processor-communication unit 43 of the touch-sensitive device 100 may be able to periodically read data from the touchpad sensor of the touch sensor layer 2 at a sampling rate. When patterns 10-13 on the pattern pads 200 touch the touch-sensitive device 100, the touchpad sensor may provide all coordinates of touch detections to controller-processor-communication unit 43. Controller-processor-communication unit 43 may process the touch coordinates from the touchpad sensor to detect patterns 10-13 on pattern areas A, B, C and D and to evaluate the center point coordinates of the pattern areas A, B, C and D.

Figure 5:
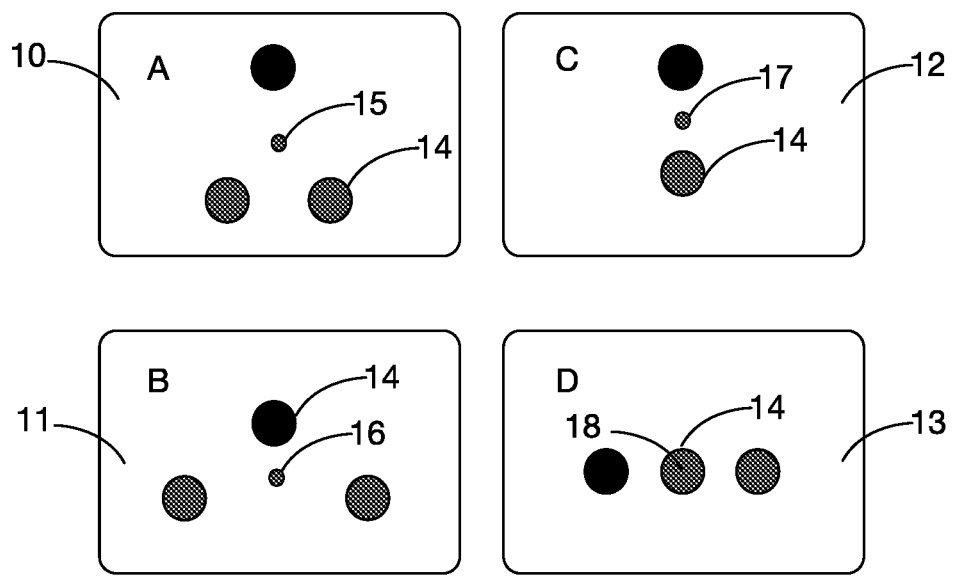
FIG. 5 illustrates center points for exemplary patterns according to various embodiments of the present disclosure.

In one embodiment, the touchpad sensor of the touch sensor layer 2 may be a projected capacitive digitizer supporting multi-touch, and the patterns 10-13 for A, B, C and D are made by stylus-type dots 14 in a round shape. The controller-processor-communication unit 43 is able to process coordinates of the detected touch points from the exemplary multi-touch digitizer of the touch sensor layer 2 to produce all coordinates of all stylus-type dots in the digitizer's 2-D coordinate system. A processor, which may be the controller-processor-communication unit 43 or an external processor that gets the coordinates information from the controller-processor unit 43, may then process coordinates of all the stylus-type dots 14 for the detection of patterns 10-13, and evaluate the coordinates of the center points of detected patterns 10-13. For example, FIG. 5 illustrates center points 15, 16, 17 and 18 for patterns 10-13 formed on the pattern areas A, B, C, and D shown in FIG. 3.

Figure 6:
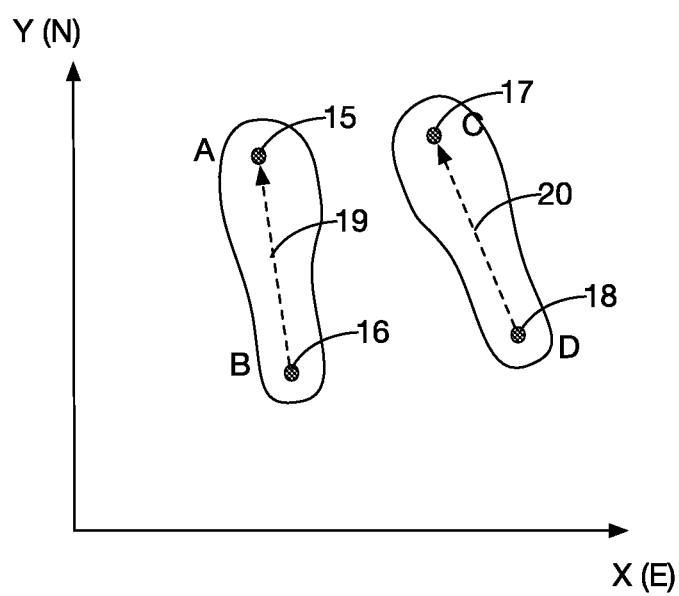
FIG. 6 illustrates coordinates of exemplary detected pattern center points and foot direction vectors according to various embodiments of the present disclosure.

FIG. 6 illustrates coordinates of the detected pattern center points 15, 16, 17, and 18 in the touch sensor's local 2D coordinates. Foot direction vectors $V_{BA}$ 19 (e.g., a vector from the pattern center point 16 on pattern area B to the pattern center point 15 on pattern area A) and $V_{DC}$ 20 (e.g., a vector from the pattern center point 18 on pattern area D to the pattern center point 17 on pattern area C) can be obtained based on the pattern center coordinate information, which provide left and/or right foot pointing directions. As shown in FIG. 6, a mapping may be made between the sensor's local coordinates and directions in a virtual world. For example, Y-axis of the touch sensor's coordinates may map to the North (N) of the virtual world, and the X-axis of the sensor's coordinates may map to the East (E) of the virtual world. This coordinate mapping is made by certain application programs to determine how the applications interpret and use foot directional information from the disclosed system.

Figure 7:
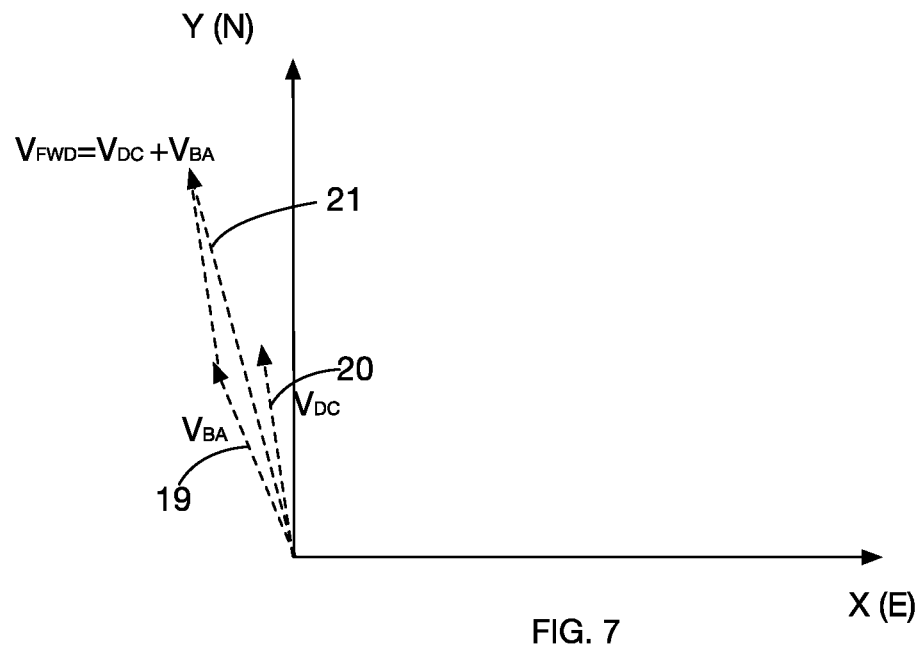
FIG. 7 illustrates a forward directional vector obtained by processing foot direction vectors according to various embodiments of the present disclosure.

FIG. 7 illustrates further processing of foot direction vectors $V_{BA}$ 19 and $V_{DC}$ 20 to obtain a fused (forward) directional vector $V_{FWD}$ 21 that can be provided as useful user directional information to other applications that run on external devices, e.g., a computer, a game console, and/or a smart phone, connected to the disclosed system.

As such, to obtain foot direction vectors $V_{BA}$ 19 and $V_{DC}$ 20, detections may be made for patterns 10-13 associated with each foot, i.e., patterns 10-11 on pattern areas A and B associated with the left foot, patterns 12-13 on pattern areas C and D associated with the right foot.

In the present disclosure, a foot direction vector can be obtained with the detection of one pattern on one foot. To achieve this, the pattern design for patterns on pattern areas A, B, C, D are designed to be rotation-sensitive, for example, full or half rotation-sensitive.

A pattern is full rotation-sensitive, when two pattern feature points, which can be uniquely identified after any unknown pattern movement, e.g., a rotation and/or translation movement, can be found/selected. For a full rotation-sensitive pattern, the two selected uniquely identifiable feature points may be used to define a pattern reference directional vector as the pattern's pointing direction. Such a pattern reference directional vector can be uniquely identified/obtained after any unknown pattern movement. For example, for a pattern consisting of three dots, when the virtual triangle formed by connecting the three pattern dots has two and only two sides that have the same length, the three-dot pattern is a full rotation-sensitive pattern. In this case, the first uniquely identifiable feature point can be the center point of the non-equal length side of the triangle; and the second uniquely identifiable feature point can be the common vertex shared by the two equal length sides. Both of the feature points are unique to the pattern and can be identified regardless any unknown pattern movement. The pattern reference directional vector may be defined as the vector from the first uniquely identifiable feature point to the second uniquely identifiable feature point, which can also be uniquely identified/evaluated after any unknown pattern movement.

A pattern is half rotation-sensitive, when two pattern feature points can be found/selected, which are only non-distinguishable between themselves after any unknown pattern movement (they are distinguishable from any other possible pattern feature points). For a half rotation-sensitive pattern, the selected two non-distinguishable feature points can be used to define two vectors which are in opposite directions and are only non-distinguishable between themselves after unknown pattern movement. One of the two vectors can be defined as a pattern reference directional vector for the pattern. The other vector is the companion vector of the pattern reference directional vector. For example, a pattern formed by two dots is half rotation-sensitive. The two pattern dots form a set of two feature points that are only non-distinguishable between themselves after any unknown pattern movements. The pattern reference directional vector can be defined as the direction from a first pattern point to a second pattern point. After any unknown pattern movement, the pattern reference directional vector is only non-distinguishable from its companion vector which is the opposite direction from a second pattern point to a first pattern point.

When a pattern is placed at its designed pattern area, considering possible rotation in the placement of the pattern at each pattern area, the predefined reference directional vector on a pattern and the corresponding foot direction vector form a fixed angle, ranging from −180° to 180°.

For a full rotation-sensitive pattern, the predefined pattern reference directional vector can be obtained/evaluated using coordinates of the detected touch points corresponding to the pattern. The evaluation of the reference directional vector of a full rotation-sensitive pattern provides the foot direction vector of the corresponding foot based on their fixed angle relationship.

For a half rotation-sensitive pattern, the predefined pattern reference directional vector and its companion vector can be obtained/evaluated using coordinates of the detected touch points corresponding to the pattern. In the disclosed system, previous results of foot direction vector of the corresponding foot can be used to distinguish the pattern directional vector from its companion vector. The resulting reference directional vector of a half rotation-sensitive pattern provides the foot direction vector of the corresponding foot based on their fixed angle relationship.

Figure 8:
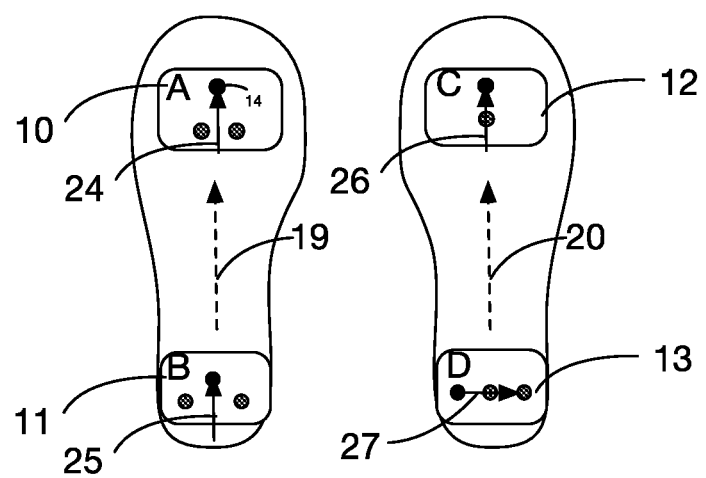
FIG. 8 illustrates predefined reference directional vectors for each pattern on a pair of pattern pads according to various embodiments of the present disclosure.

In one embodiment, as illustrated in FIG. 3, patterns 10 and 11 on pattern areas A and B are full rotation-sensitive; while patterns 12 and 13 on pattern areas C and D are half rotation-sensitive. FIG. 8 shows the reference directional vectors 24, 25, 26 and 27 for patterns 10, 11, 12 and 13 respectively. As a convenient option, the patterns may be placed at the pattern areas A, B, C and D, such that the angles from the predefined reference directional vectors 24 and 25 to the left foot direction vector 19 are both 0°, and the angle from pattern reference directional vector 26 to the right foot direction vector 20 is 0°, while the angle from pattern D's reference directional vector 27 to the right foot direction vector 20 is 90°.

Figure 9:
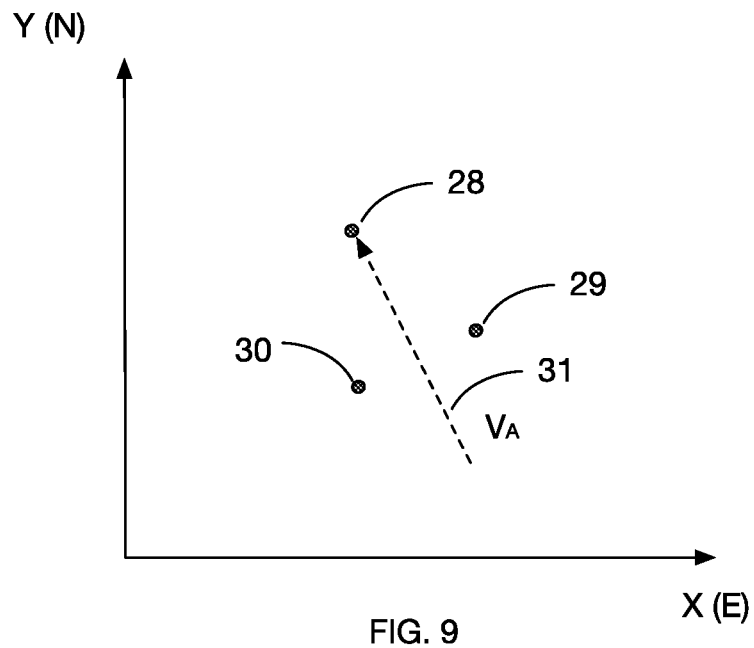
FIG. 9 illustrates calculated predefined reference directional vector for a first pattern using coordinates of detected touch points corresponding to the first pattern (which is full rotation-sensitive) according to various embodiments of the present disclosure.

FIG. 9 illustrates evaluation of the pattern reference directional vector 24 in FIG. 8 using coordinates of the detected touch points, i.e., 28, 29 and 30, which correspond to the stylus-type dots of pattern 10. The evaluated pattern reference directional vector $V_A$ 31 in FIG. 9 can be used to obtain the left foot direction vector $V_{BA}$ 19 based on the fixed and known angle relationship between 24 and 19.

Figure 10:
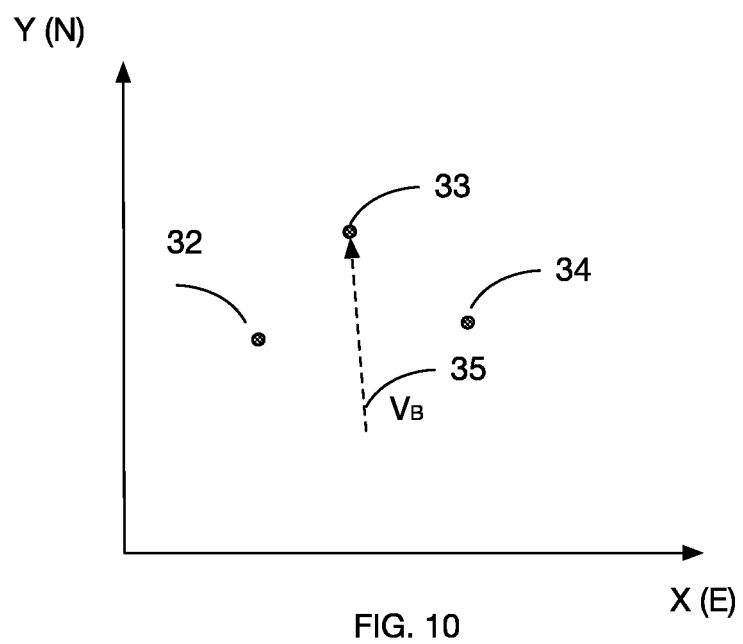
FIG. 10 illustrates calculated predefined reference directional vector for a second pattern using coordinates of detected touch points corresponding to the second pattern (which is full rotation-sensitive) in various embodiments of the present disclosure.

FIG. 10 illustrates evaluation of the pattern reference directional vector 25 in FIG. 8 using coordinates of the detected touch points, i.e., 32, 33 and 34, which correspond to the stylus-type dots of pattern 11. The evaluated pattern reference directional vector $V_B$ 35 in FIG. 10 can be used to obtain the left foot direction vector $V_{BA}$ 19 based on the fixed and known angle relationship between 25 and 19.

Figure 11:
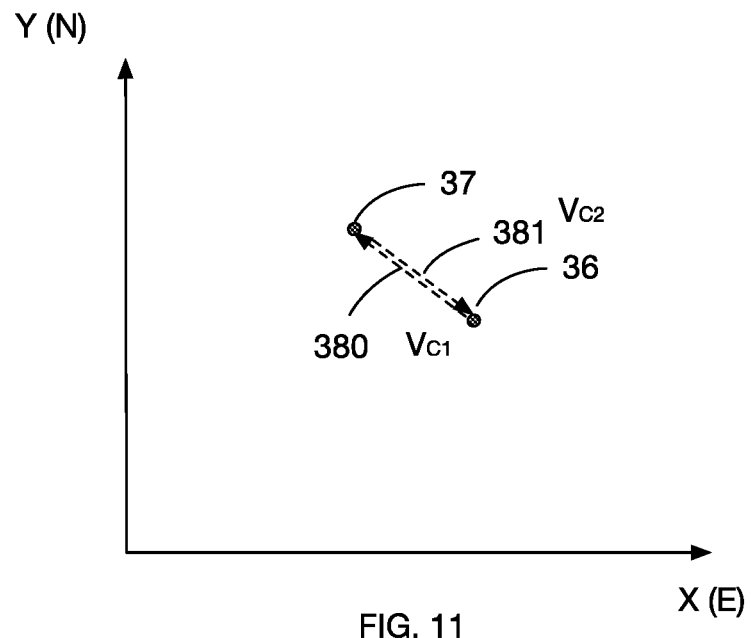
FIG. 11 illustrates a set of two calculated vectors corresponding to the predefined reference directional vector and its companion vector for a third pattern using coordinates of detected touch points corresponding to the third pattern (which is half rotation-sensitive) according to various embodiments of the present disclosure.

FIG. 11 illustrates evaluation of two vectors $V_{C1}$ 380 and $V_{C2}$ 381 that correspond to the pattern reference directional vector 26 in FIG. 8 and its companion vector, using coordinates of the detected touch points, i.e., 36, 37, which correspond to the stylus-type dots of pattern 12. With previous right foot direction vector information, the evaluated set of two vectors can be used to derive the pattern reference directional vector 26. The derived pattern reference directional vector can then be used to obtain the right foot direction vector $V_{DC}$ 20 based on the fixed and known angle relationship between 26 and 20.

Figure 12:
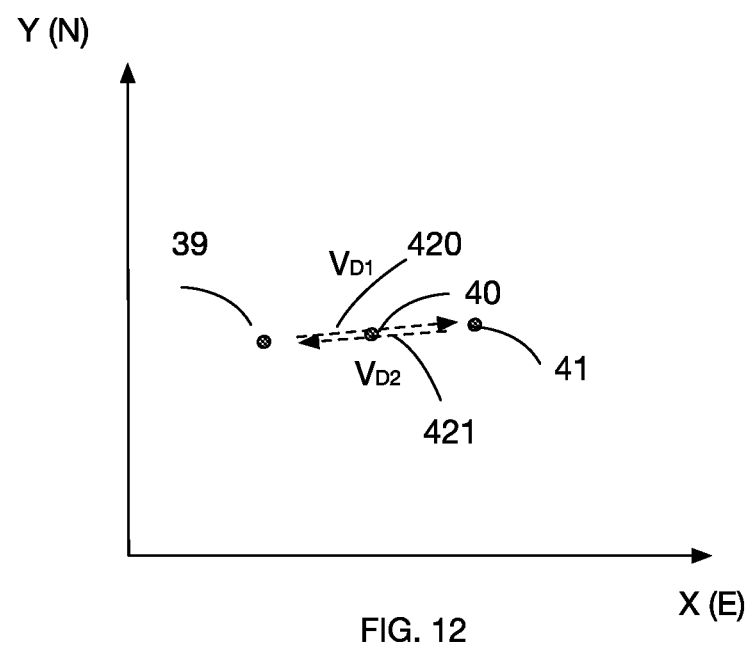
FIG. 12 illustrates a set of two calculated vectors corresponding to the predefined reference directional vector and its companion vector for a fourth pattern using coordinates of detected touch points corresponding to the fourth pattern (which is half rotation-sensitive) according to various embodiments of the present disclosure.

FIG. 12 illustrates evaluation of two vectors $V_{D1}$ 420 and $V_{D2}$ 421 that correspond to the pattern reference directional vector 27 in FIG. 8 and its companion vector, using coordinates of the detected touch points, i.e., 39, 40 and 41 which correspond to the stylus-type dots of pattern 13. With previous right foot direction vector information, the evaluated set of two vectors can be used to derive the pattern reference directional vector 27. The derived pattern reference directional vector can then be used to obtain the right foot direction vector $V_{DC}$ 20 based on the fixed and known angle relationship between 27 and 20.

In addition to providing foot pointing information, the pattern detection results may also be used for detections of simple foot actions and complex foot gestures.

Figure 13:
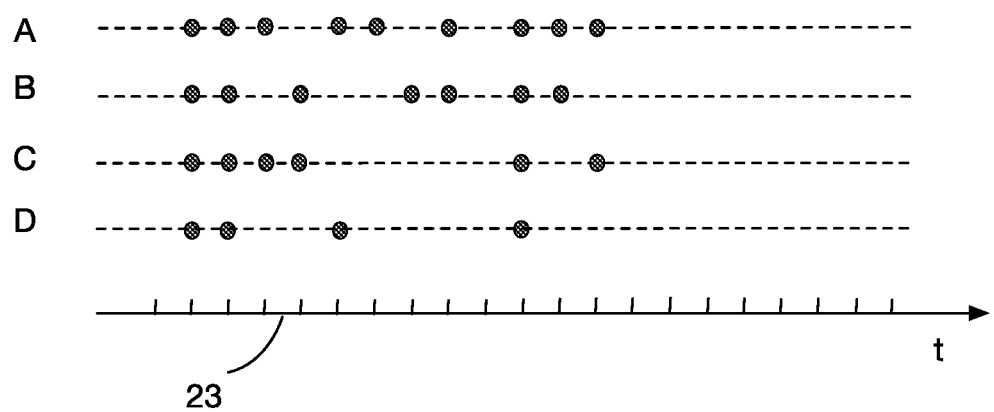
FIG. 13 illustrates detection results of different patterns over time by a touch-sensitive device according to various embodiments of the present disclosure.

FIG. 13 illustrates pattern detection results obtained by the disclosed touch-sensitive device over time in the present disclosure when using the foot-operated touchpad system in FIG. 4.

In FIG. 13, at each sampling time t, controller-processor-communication unit 43 may read raw coordinates of the detected touch points (corresponding to the stylus-type dots) from sensor in the touch sensor layer 2 of the touch-sensitive device 100. The raw coordinates are then processed for the detection of patterns 10-13 on the pattern area A, B, C and D, the evaluation of the detected pattern center coordinates, as well as the evaluation of the pattern reference directional vectors. The coordinates of the detected pattern centers and the calculated the pattern reference directional vectors and possible companion vectors may be used to derive foot direction vectors 19 and 20. Such information may be further used to obtain user directional information as well as foot gesture information from simple gestures, such as taps, to complex behaviors, such as walking, jumping and running.

Figure 14:
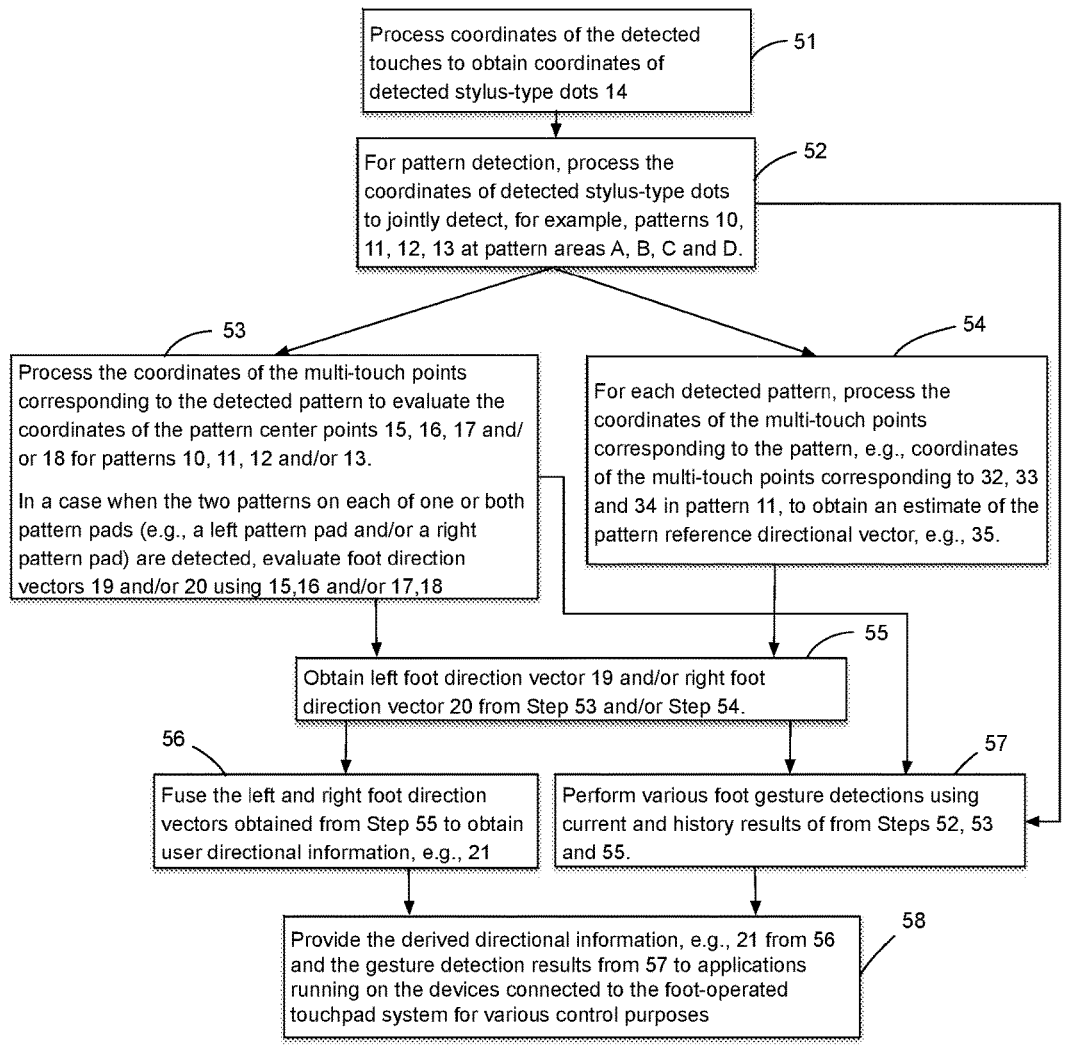
FIG. 14 illustrates information processing flow at one sampling time according to various embodiments of the present disclosure.

FIG. 14 illustrates an exemplary information processing flow at a sampling time according to various embodiments of the present disclosure.

In Step 51: all coordinates (or raw coordinates) of detected touch points can be obtained from the touch sensor layer 2 in the touch-sensitive device. The coordinate data of the touch points (e.g., multi-touch points) can then be processed to obtain coordinates of detected stylus-type dots 14 corresponding to the detected touch points.

In Step 52: the coordinates of detected stylus-type dots 14 corresponding to the detected touch points are processed for pattern detection to jointly detect, for example, patterns 10, 11, 12, 13 at pattern areas A, B, C and D.

For example, the controller-processor-communication unit of the touch sensitive device may be programmed to identify coordinates of detected touch points corresponding to the detected stylus-type dots in each of the distinct patterns to provide pattern detection results. The pattern detection results may include detected pattern(s) at each touch sensor data sampling time, and the coordinates of the detected touch points corresponding to each detected pattern.

In Step 53: The coordinates of the multi-touch points corresponding to a detected pattern, e.g., coordinates 28, 29 and 30 in FIG. 9, which correspond to the stylus-type dots forming pattern 10, may be processed to evaluate the coordinates of the corresponding pattern center point, e.g., pattern point 15 for the pattern 10, and/or center points 16, 17 and 18 for patterns 11-13.

Still in Step 53: In a case when the two patterns on each of one or both pattern pads (e.g., a left pattern pad and/or a right pattern pad) have been detected by the touch-sensitive device, the coordinates of detected pattern center points, e.g., center points 15, 16 for the left foot, and center points 17, 18 for the right foot as shown in FIG. 5, may be used to evaluate foot direction vectors of the corresponding foot, i.e., 19 and/or 20 as illustrated in FIG. 6.

In Step 54: in a case when one or both of the two patterns on each of one or both pattern pads (e.g., a left pattern pad and/or a right pattern pad) are detected by the touch-sensitive device, for each detected pattern, the coordinates of the multi-touch points corresponding to the detected pattern, e.g., coordinates 32, 33, and 34 corresponding to the stylus-type dots forming pattern 11, may be processed to obtain the estimate of the corresponding pattern reference directional vector, e.g., 35, and possible companion vectors (for a half rotational sensitive pattern), which can be used to derive the corresponding foot direction vector 19 and/or 20.

In this case, for full rotation-sensitive patterns pattern 10 and 11, estimates of the corresponding pattern reference directional vectors 31 and 35 are shown in FIGS. 9-10 respectively. For half rotation-sensitive patterns 12, the set of two estimated vectors 380 and 381 which correspond to the pattern's reference directional vector and the companion vector is shown in FIG. 11. For half rotation-sensitive pattern 13, the set of two estimated vectors 420 and 421 that correspond to the pattern's reference directional vector and the companion vector is shown in FIG. 12.

For a full rotation-sensitive pattern such as 10 or 11, the estimated reference directional vector of an individual pattern may be used to obtain the foot direction vector of the corresponding foot, e.g., 19, based on the fixed and known angle information between the two directional vectors.

For a half rotation-sensitive pattern, such as 12 or 13, the estimated set of two vectors correspond to the pattern reference directional vector and its companion vector. Information of the previous foot direction vector estimate of the foot, e.g., 20 can be used to distinguish the pattern reference directional vector from its companion vector. The identified pattern reference directional vector estimate of an individual pattern may be used to obtain the current foot direction vector of the corresponding foot, e.g., 20, based on the fixed and known angle information between the two directional vectors.

In various embodiments, when it is not possible to obtain the foot directional information for a foot from the pattern center point coordinates, the pattern reference directional vector estimates may be used to derive the exemplary left foot direction vector 19 and/or the exemplary right foot direction vector 20 of the corresponding foot/feet.

In Step 55: left foot direction vector 19 and/or right foot direction vector 20 may be obtained from Step 53 and/or Step 54.

In Step 56: the left and right foot direction vector obtained from Step 55 may be fused to obtain user directional information, e.g., characterized by directional vector 21 as shown in FIG. 7.

In Step 57: various foot gesture detections may be performed using current and history results of pattern detection results obtained in Step 52, pattern center point coordinates obtained in Step 53, and foot direction vectors in Step 55.

In Step 58, user directional information, e.g., characterized by directional vector 21 as shown in FIG. 7, from Step 56, and/or the foot gestures in Step 57 may be provided to applications running on device(s) connected to the foot-operated touch pad system for various control purposes.

Referring back to FIG. 13, at each sampling time, the pattern detection results can be represented by a pattern set, such as {A}, {A B}, {A B C D}, {C}, { }, etc. The empty set { } corresponds to no pattern for any pattern area is detected at the time.

To define foot gesture, the pattern detection state is defined as a certain combination of one or multiple pattern sets. For example, detection state {A&B&C} (where "&" is the "and" operator) means the pattern state requires the detection of patterns in areas A, B and C. As a result, only detected pattern set {A B C} belongs to the pattern state.

As another example, pattern detection state {A|B} (where "|" is the "or" operator) means the pattern detection state requires the detection of the pattern in area A or B. As a result, detected pattern sets {A} {B} and {A, B} satisfy the state requirement, and would belong to pattern detection state {A|B}.

Further, pattern state transition is defined as when the detected pattern set move from one pattern detection state to a different pattern detection state. When the detected pattern set at a sampling time belongs to the same pattern detection state as the previous detected pattern set, there is no pattern state transition.

In the present disclosure, foot gestures are defined and determined based on transitions between pattern detection states over time in conjunction with pattern location information, and foot directional information. Exemplary foot gestures are defined as follows.

Left foot tap type 1: tap with the front part of left foot.
The pattern detection states follow transition sequence {A&B&C&D}→{B&C&D}→{A&B&C&D}→{B&C&D}→{A&B&C&D}.

Detected coordinates of patterns 10-13 on pattern areas A, B, C and D stay roughly the same.

Note that the pattern detection state transition sequence may repeat itself for multiple times.

Left foot tap type 2: tap with the heel part of left foot.
The pattern detection states follow transition sequence {A&B&C&D}→{A&C&D}→{A&B&C&D}→{A&C&D}→{A&B&C&D}.

Detected center coordinates of patterns 10-13 on pattern areas A, B, C and D stay roughly the same.

Right foot tap type 1: tap with the front part of right foot.

The pattern detection states follow transition sequence {A&B&C&D}→{A&B&D}→{A&B&C&D}→{A&B&D}→{A&B&C&D}.

Detected center coordinates of patterns 10-13 on pattern areas A, B, C and D stay roughly the same.

Right foot tap type 2: tap with the heel part of right foot.

The pattern detection states follow transition sequence {A&B&C&D}→{A&B&C}→{A&B&C&D}→{A&B&C}→{A&B&C&D}.

Detected center coordinates of patterns 10-13 on pattern areas A, B, C and D stay roughly the same.

One-foot hop type 1: Left foot hop.

The pattern detection states follow transition sequence {A|B}→{ }→{A|B}→{ }→{A|B}→{ }

Note that detection state {A|B} consists of three detection sets {A}, {B} and {A B}. In this case, even when the detection set changes from {A} to {A B}, there is no detection state transition.

One-foot hop type 2: Right foot hop

The pattern detection states follow transition sequence {C|D}→{ }→{C|D}→{ }→{C|D}→{ }.

Jump using both feet.

The pattern detection states follow transition sequence {A|B|C|D}→{ }→{A|B|C|D}→{ } {A|B|C|D}.

Left foot wiggle type 1: left foot wiggle with the front of the left foot as the pivot.

The pattern detection state stays at {(A&C&D)|(A&B&C&D)} which covers two possible detection sets {A C D} and {A B C D}

Detected center coordinates of pattern A C D stay roughly the same.

The estimated left foot direction vector, $V_{BA}$ 19 wiggles from side to side.

Left foot wiggle type 2: left foot wiggle with the heel of the left foot as the pivot.

The pattern detection state stays at {(B&C&D)|(A&B&C&D)} which covers two possible detection sets {B C D} and {A B C D}.

Detected center coordinates of pattern B C and D stay roughly the same.

The estimated left foot direction vector, $V_{BA}$ 19 wiggles from side to side.

Right foot wiggle type 1: right foot wiggle with the front of the right foot as the pivot.

The pattern detection state stays at {(A&B&C)|(A&B&C&D)}.

Detected center coordinates of patterns A, B, and C stay roughly the same.

The estimated right foot direction vector, $V_{DC}$ 20 wiggles from side to side.

Right foot wiggle type 2: right foot wiggle with the heel of the right foot as the pivot.

The pattern detection state stays at {(A&B&D)|(A&B&C&D)}.

Detected center coordinates of patterns A B D stay roughly the same.

The estimated left foot direction vector, $V_{DC}$ 20 wiggles from side to side.

Figure 15:
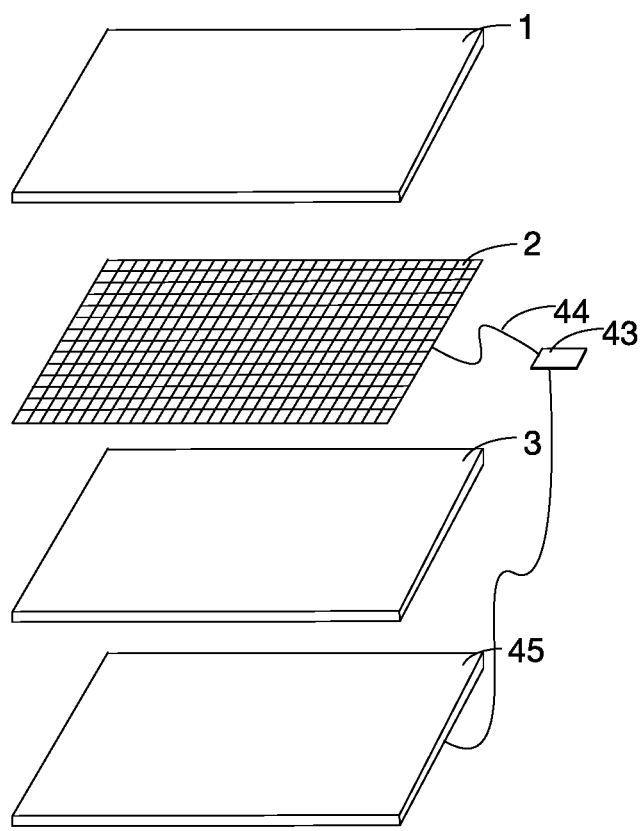
FIG. 15 illustrates another exemplary touch-sensitive device according to various embodiments of the present disclosure.
Figure 16:
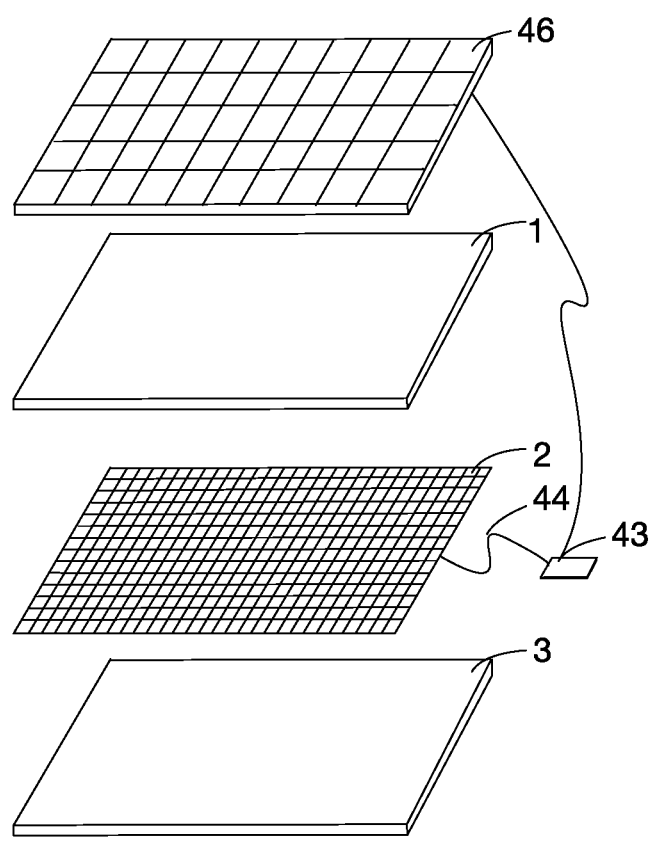
FIG. 16 illustrates another exemplary touch-sensitive device according to various embodiments of the present disclosure.

Pressure measurements on the touch-sensitive device can also be obtained along with the pattern detections using extended designs of the touch-sensitive device as shown in FIG. 15 and FIG. 16.

In FIG. 15, another exemplary touch-sensitive device 1500 may include a weight sensor 45 configured within the touch-sensitive device 100 in FIG. 1. For example, when the first protection layer 1 is placed on a top and the second protection layer 3 is placed on a bottom of the touch-sensitive device, the weight sensor 45 may be placed on the first protection layer 1, between the first protection layer 1 and the touch sensor layer 2, between the touch sensor layer 2 and the second protection layer 3, or under the second protection layer 3.

The weight sensor 45 may be able to provide a measurement of the total weight applied over the touch-sensitive device at each sampling time. The weight sensor 45 can be connected with the controller-processor-communication unit 43. The weight measurement can also be used for performing foot gesture detections to improve the speed, accuracy of complex gesture detections and to support the detection of foot/body motion and gestures that cannot be accomplished using pattern detection information alone.

In FIG. 16, another exemplary touch-sensitive device 1600 may include a pressure sensor array 46 configured on top of the touch-sensitive device 100 in FIG. 1, such as on top of the first protect layer 1 of the touch-sensitive device 100 in FIG. 1. At each sampling time, pressure measurements from the sensor array can be associated with the coordinates of the detected pattern centers 15, 16, 17 and/or 18 illustrated in FIGS. 5-6 to decide the pressure distribution and changes on each detected pattern. The pressure sensor array 46 can be connected with the controller-processor-communication unit 43. The pressure distribution information can also be used for performing foot gesture detections to improve the speed, accuracy of complex gesture detections and to support the detection of foot/body motion and gestures that cannot be accomplished using pattern detection information alone.

Alternatively, different from the exemplary touch-sensitive devices shown in FIGS. 15-16, pressure sensors can be placed on any side of the backing layer at the positions corresponding to patterns 10-13 of pattern areas A, B, C, and D to obtain pressure measurements at the corresponding pattern locations (see FIG. 2). In one embodiment, when the backing layer of the patterns is a shoe sole, or the patterns 10-13 are attached to shoe soles, pressure sensors can be placed in the shoes at locations corresponding to the patterns 10-13, or can be placed between the shoe sole and each pattern 10/11/12/13. The sensor pressure measurements can be transmitted wirelessly through transmitters inserted in the shoes to the controller-processor unit 43, which is then able to use the pressure measurements along with the pattern detection results for gesture detections.

The present disclosure is able to obtain rich action and gesture information from human feet that are not available from existing hand operation based systems. The information from the present disclosure can be used for device control, video game applications, interactive 3D programs and virtual reality applications.

What is claimed is:
1. A foot-operated touchpad system comprising:
a touch-sensitive device; and
a foot-wearable pattern pad, including:
 a backing layer including pattern areas, wherein the pattern areas are positioned such that: when a human foot is placed on the backing layer, the pattern areas correspond to a fore part and a heel part of the human foot, and
 patterns on the pattern areas, arranged in a manner having one pattern on one pattern area, wherein the patterns on different pattern areas are distinguishable from each other, each pattern being rotation-sensi- tive and including a number of stylus-type dots that are capable of interacting with the touch-sensitive device.

2. The foot-operated touchpad system according to claim 1, wherein:
the pattern areas are positioned such that:
when a human left foot is placed on the foot-wearable pattern pad, the pattern areas correspond to a fore part and a heel part of the human left foot, and
when a human right foot is placed on the foot-wearable pattern pad, the pattern areas correspond to a fore part and a heel part of the human right foot.

3. The foot-operated touchpad system according to claim 1, further including:
a pair of foot-wearable pattern pads corresponding to a pair of human feet, wherein:
the pair of foot-wearable pattern pads includes four different pattern areas including:
a first pattern area positioned corresponding to a fore part of a bottom of a human left foot,
a second pattern area positioned corresponding to a heel part of the bottom of the human left foot,
a third pattern area positioned corresponding to a fore part of a bottom of a human right foot, and
a fourth pattern area positioned corresponding to a heel part of the bottom of the human right foot,
wherein the patterns on the first pattern area, the second pattern area, the third pattern area, and the fourth pattern area are distinct and rotation-sensitive patterns.

4. The foot-operated touchpad system of claim 3, wherein the distinct patterns are distinguishable first in a shape, then in a size.

5. The foot-operated touchpad system according to claim 1, wherein:
the backing layer is a single layer including a paper sheet, a fabric cloth, a sock, an insole, and a shoe sole.

6. The foot-operated touchpad system according to claim 1, wherein:
the backing layer includes one or more layers selected from a paper sheet, a fabric cloth, a sock, an insole, and a shoe sole, wherein the one or more layers are stacked with one another.

7. The foot-operated touchpad system according to claim 1, wherein the touch-sensitive device includes:
a touch sensor layer sandwiched between a first protection layer and a second protection layer, and
a controller-processor-communication unit used to: control the touch-sensitive device for pattern touch detection; process detected touch coordinates for pattern detections; process the pattern touch detections for foot direction information extraction; and send processed information to an external device through a communication link.

8. The foot-operated touchpad system according to claim 7, wherein:
each of the first protection layer and the second protection layer is capable of protecting the touch sensor layer from being damaged and malfunctioning when a pressure is applied thereon from the human foot.

9. The foot-operated touchpad system according to claim 7, wherein:
the touch sensor layer includes a multi-touch sensor configured to obtain coordinates of detected touch points, corresponding to the stylus-type dots of the foot-wearable pattern pad applied there-on.

10. The foot-operated touchpad system according to claim 1, wherein:
the touch-sensitive device further includes a weight sensor configured to provide a measurement of a total weight applied over the touch-sensitive device, or further includes a pressure sensor array configured as a top of the touch-sensitive device, or
the foot-operated touchpad system includes a pressure sensor configured on a side of the backing layer at a location in line with each pattern area.

11. A method for using a foot-operated touchpad system, comprising:
detecting a pressing by human feet on a pair of pattern pads to touch a touch-sensitive device;
obtaining coordinates of touch points provided by the touch-sensitive device;
based on the coordinates of the touch points, determining one or more detected patterns on the pair of the pattern pads, wherein each of the pair of the pattern pads includes patterns on a backing layer; and
obtaining a left foot direction vector and a right foot direction vector by processing information of the one or more detected patterns.

12. The method according to claim 11, wherein the coordinates of the pattern center points of the detected patterns are obtained by:
detecting each pattern on each pattern pad by the touch-sensitive device; and
processing the coordinates of the touch points corresponding to each pattern on each pattern pad to provide coordinates of pattern center points of the patterns on each pattern pad.

13. The method according to claim 11, wherein the step of obtaining a left foot direction vector and a right foot direction vector includes:
when the two patterns on each pattern pad have been detected by the touch-sensitive device, for each detected pattern:
using the coordinates of the pattern center points of the detected two patterns on a first pattern pad to provide a left foot direction vector; and
using the coordinates of the pattern center points of the two patterns on a second pattern pad to provide a right foot direction vector.

14. The method according to claim 11, wherein the step of obtaining a left foot direction vector and a right foot direction vector includes:
when one or two patterns on each pattern pad are detected by the touch-sensitive device, for each detected pattern:
processing the coordinates of the touch points corresponding to a detected pattern to obtain a predefined pattern reference directional vector of the corresponding detected pattern, wherein:
the calculated pattern reference directional vector corresponding to each of the one or two patterns on a first pattern pad provides a left foot direction vector, and
the calculated pattern reference directional vector corresponding to each of the one or two patterns on a second pattern pad provides a right foot direction vector.

15. The method according to claim 11, wherein:
each pattern includes stylus-type dots capable of interacting with the touch-sensitive device, and
the detected touch points correspond to a number of stylus-type dots in each of the patterns that are distinct.

16. The foot-operated touchpad system according to claim 7, wherein:
the controller-processor-communication unit is further configured to perform foot gesture detections, and to send the processed information to the external device.

* * * * *